United States Patent [19]
Bobst

[11] Patent Number: 5,456,201
[45] Date of Patent: Oct. 10, 1995

[54] AIR BUBBLE LUBRICATED BOAT HULL

[76] Inventor: Glen L. Bobst, 2910 N. St. Helena Hwy., St. Helena, Calif. 94574

[21] Appl. No.: 42,568

[22] Filed: Apr. 5, 1993

Related U.S. Application Data

[63] Continuation-in-part of Ser. No. 822,320, Jan. 16, 1992, abandoned.

[51] Int. Cl.$^6$ ........................................................ B63B 1/32
[52] U.S. Cl. ........................ 114/289; 114/67 A; 114/222
[58] Field of Search .................... 114/271, 288–291, 114/65 R, 67 R, 67 A, 222, 74 A; D2/314, 313

[56] References Cited

U.S. PATENT DOCUMENTS

| | | | |
|---|---|---|---|
| 2,231,296 | 2/1944 | Sartori | 114/66.5 |
| 3,316,874 | 5/1967 | Canazzi | 114/67 |
| 3,547,064 | 12/1970 | Glass | 114/289 |
| 3,680,517 | 8/1972 | Morrison | 114/67 A |
| 3,871,318 | 3/1975 | Clerk | 114/67 A |
| 4,165,703 | 8/1979 | Burg | 114/67 A |
| 4,231,315 | 11/1980 | Peters | 114/291 |
| 4,392,445 | 7/1983 | Burg | 114/67 A |
| 4,393,802 | 7/1983 | Rizzo | 114/67 A |
| 4,535,712 | 8/1985 | Matthews | 114/61 |
| 4,615,407 | 10/1986 | Wilson et al. | 180/128 |
| 4,649,851 | 1/1987 | April | 114/271 |
| 4,848,702 | 7/1989 | Riggins | 114/289 |
| 4,896,621 | 1/1990 | Coles | 114/674 |
| 4,987,844 | 1/1991 | Nadolink | 114/20.1 |
| 4,989,534 | 2/1991 | Field | 114/289 |
| 5,015,372 | 5/1991 | Mercer | 114/222 |
| 5,025,745 | 6/1991 | Wine | 114/289 |

Primary Examiner—Robert J. Oberleitner
Assistant Examiner—Clifford T. Bartz
Attorney, Agent, or Firm—Harris Zimmerman

[57] ABSTRACT

Frictional resistance to motion of a boat is reduced by generating an unconfined layer of intermixed air bubbles and water adjacent at least a portion of the hull of the boat including at upcurving side surfaces of the hull. In the preferred form of the invention, an array of spaced apart airflow apertures in the hull extends outward and upward at each side of the keel at a plurality of locations along the hull. Air is forced through the apertures by a compressor or a forward facing air scoop or by a combination of both. In the preferred embodiment, barnacle inhibiting fluid may be released through the array of apertures when the boat is docked or at anchor.

1 Claim, 4 Drawing Sheets

AIR BUBBLE LUBRICATED BOAT HULL

CROSS REFERENCE TO RELATED APPLICATION

This application is a continuation-in-part of my U.S. patent application Ser. No. 07/822,320 filed Jan. 16, 1992 and having the same title as this present application, and now abandoned.

TECHNICAL FIELD

This invention relates to boats or ships of the type having a hull that extends underwater and more particularly to a boat construction and a method for reducing frictional resistance to motion of such watercraft. The invention may also be used to inhibit adherence of barnacles to the hulls of boats or ships.

BACKGROUND OF THE INVENTION

Motor powered or wind powered movement of boats is greatly impeded by friction or drag arising from the contact of the moving hull with adjacent water. Friction can be reduced to some extent by configuring the hull with hydrodynamic principles in mind but this may adversely affect other characteristics of the boat. For example, flattening of the hull reduces drag by reducing the area of the hull that is in contact with water but also roughens the travel of the boat particularly in the the presence of waves.

Certain prior forms of watercraft reduce frictional drag by creating and entrapping a cushion of air beneath the hull or at least a portion of the hull. Confining the air cushion requires that there be a sizable concavity in the underside of the hull or that skirts extend downward from the hull along the boundaries of the air cushion. The rim of the concavity or the lower edges of the skirts must lie in a horizontal plane in order to entrap the air cushion and thus the technique mandates an essentially flat bottomed hull configuration. Thus these prior air cushions are not applicable to all forms of hull configuration and are generally limited to small craft of the type that plane along the water surface when traveling at high speed.

Air cushioning is carried to an extreme in a class of watercraft known as surface effect ships or hovercraft. Such vessels have a skirt encircling the underside of the craft and are supported above the water during operation by forcing a downflow of air into the region encircled by the skirt. This again dictates that the craft have an essentially flat and horizontal underside. Reduction of friction is gained at the cost of substantially increased power requirements and a loss of precision in controlling movement of the craft.

It would be advantageous if friction resistance to movement of a boat could be reduced without introducing constraints on the configuration of the boat hull. This would increase the efficiency of boats having, for example, V-shaped hulls or U-shaped hulls without compromising the operational advantages of such hulls such as stability, passenger comfort, cargo capacity and manuverability.

Frictional resistance to the motion of boats and ships is also increased by barnacles which adhere to the hull. Coating of the hull with barnacle repelling paints or the like is only temporarily effective and can cause environmental problems by releasing harmful constituents of the paints into the water.

The present invention is directed to overcoming one or more of the problems discussed above.

SUMMARY OF THE INVENTION

In one aspect of the present invention, a boat of the type having a hull region that is submerged during floatation of the boat has a plurality of spaced apart airflow apertures arranged in an array that extends both transversely and longitudinally at the submerged region of the hull. The array includes forward apertures that are closest to the bow of the boat, rearward apertures that are closest to the stern and additional apertures situated in the region between the forward and rearward apertures at a plurality of locations that are progressively further from the bow. The apertures are sized and positioned to generate an unconfined layer of intermixed air bubbles and water that extends along at least a portion of the submerged region of the hull in contact with the hull. The boat further includes means for emitting a flow of air at the airflow apertures.

In another aspect, the invention provides a boat having a hull with a plurality of airflow apertures arranged in an array that extends outward and upward from the keel region at both of the opposite side surfaces of the hull at a plurality of locations along the length of the hull including at locations which are progressively more distant from the bow of the boat. Means are provided .for directing an outflow of air through the airflow apertures to generate an unconfined layer of air bubbles adjacent the hull including at the side surfaces of the hull.

In still another aspect, the invention provides a method of reducing frictional resistance to motion of a boat of the type having a hull region that is submerged during travel of the boat. Steps in the method include directing a flow of air to the submerged region of the hull and maintaining a layer of intermixed air bubbles and water adjacent at least a portion of the submerged region of the hull by releasing the airflow into the adjacent water at a plurality of spaced apart locations along the hull including at a series of locations that are progressively more distant from the bow of the boat and at locations that extend upward at each side of the hull.

In a further aspect, the invention provides a boat having a hull region which is submerged during flotation of the boat and having an array of spaced apart flow emitting apertures which extends longitudinally along the submerged region. The boat further includes at least one container for storing a fluid which inhibits adherence of barnacles to the hull and means for directing a flow of the fluid out of the apertures and into the water that is adjacent the hull.

The invention creates a layer or film of bubbles adjacent the submerged region of a boat hull by releasing a flow of air at numerous spaced apart locations on that region of the hull. This substantially reduces frictional drag by, in effect, lubricating the interface of the boat hull and adjacent water. The reduction of friction results in reduced drive power requirements and/or greater speed with a given motor power output. The air bubbles may travel freely along the hull and up the sides of the hull towards the water surface and thus the boat hull need not have a concave undersurface or other specialized configuration for the purpose of entrapping air. Consequently, the invention is compatible with boats of virtually any configuration and size including deep draft boats having V-shaped or U-shaped hull cross sections. In the preferred form of the invention the boat is further equipped with means for releasing a flow of barnacle inhibiting fluid through the array of airflow apertures when the boat is docked or at anchor.

The invention, together with further aspects and advantages thereof, may be further understood by reference to the following description of preferred embodiments and by reference to the accompanying drawings.

DETAILED DESCRIPTION OF THE PREFERRED EMBODIMENTS

Figure 1:
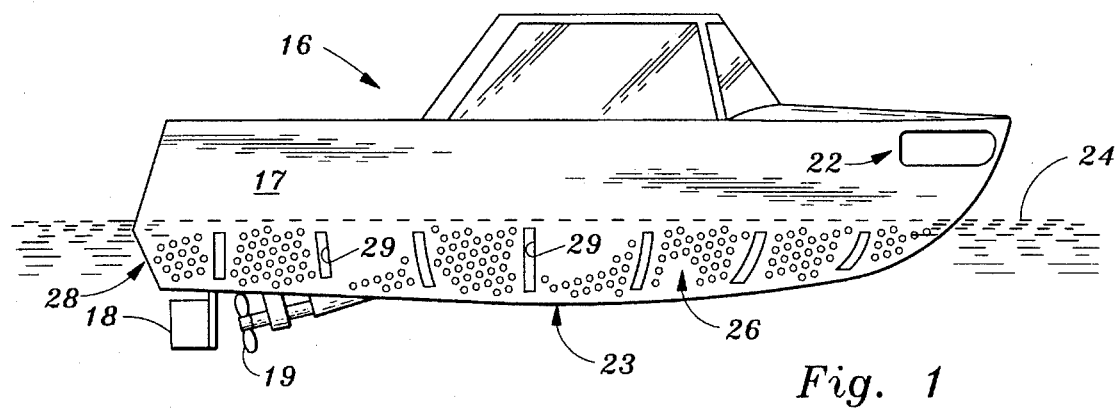
FIG. 1 is an elevation view of a boat in accordance with a preferred embodiment of the invention.
Figure 2:
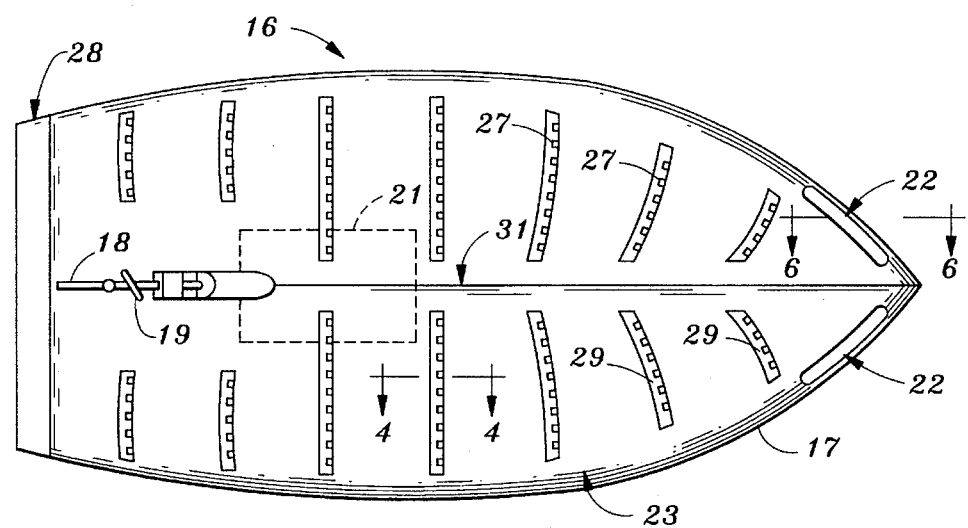
FIG. 2 is a view of the underside of the boat of FIG. 1.
Figure 3:
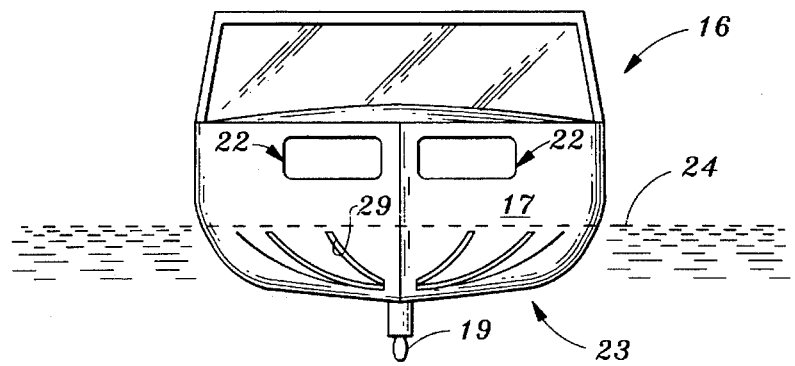
FIG. 3 is a front view of the boat of the preceding figures.

Referring jointly to FIGS. 1, 2 and 3 of the drawings, for purposes of example the invention is shown embodied in a boat 16 of the small craft type. It should be recognized that the invention is equally applicable to large vessels. Compatibility with boats, ships, barges and the like of diverse sizes and configurations is an important advantage of the invention.

The boat 16 of this example is of conventional design except as hereinafter described and thus has a hull 17, steering rudder 18 and a propeller 19 which is turned by motor 21 that is of the inboard type in this embodiment. The invention can also be embodied in sailing ships.

In accordance with the method of the invention, frictional resistance to powered travel of the boat 16 is reduced by directing a flow of air from air intakes 22 into the submerged region 23 of hull 17 that is below the surface of the water 24 that supports the boat. A layer 26 or film of intermixed air bubbles and water is created adjacent the submerged region 23 of the hull by releasing the airflow into the water 24 at a plurality of spaced apart locations along the hull region 23 which locations are defined by spaced apart airflow apertures 27 27 in the hull.

Figure 4:
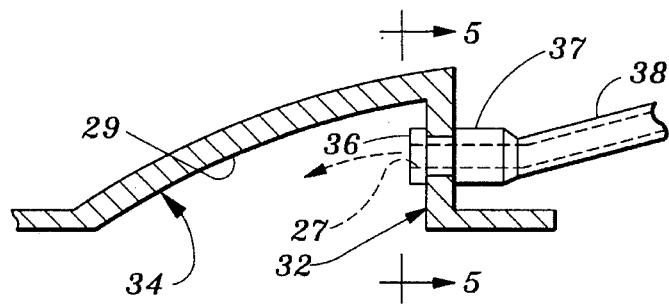
FIG. 4 is a section view of a portion of the hull of the boat taken along line 4—4 of FIG. 2.
Figure 5:
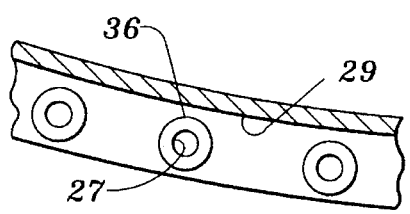
FIG. 5 is a section view taken along line 5—5 of FIG. 4.

Apertures 27 are arranged in an array which extends transversely on the hull 17 at locations that are forward from the stern 28 of the boat. In this embodiment, the airflow apertures 27 are situated within a series of spaced apart grooves 29 formed in the underside of hull 17 and which extend upward and outward from the keel region 31 of the hull at each side of the hull. Referring to FIGS. 4 and 5 in combination, each such groove 29 has an upwardly extending forward surface 32 that faces away from the bow 33 of the boat 16 and along which the spaced apart airflow apertures 27 are situated. The opposite back surface 34 of the groove is impacted by air emitted from apertures 27 and is inclined relative to the forward surface 32 to channel the airflows back along the following portions of hull 17.

The apertures 27 are axial passages in a series of flanged fittings 36 which extend through the hull at the groove front surfaces 32 and each of which is engaged by a threaded coupling 37 which is at the end of one of a series of flexible air hoses 38. The abutment of fittings 36 and hull 17 is sealed by welding, adhesive or other means to prevent water leakage into the hull.

Figure 8:
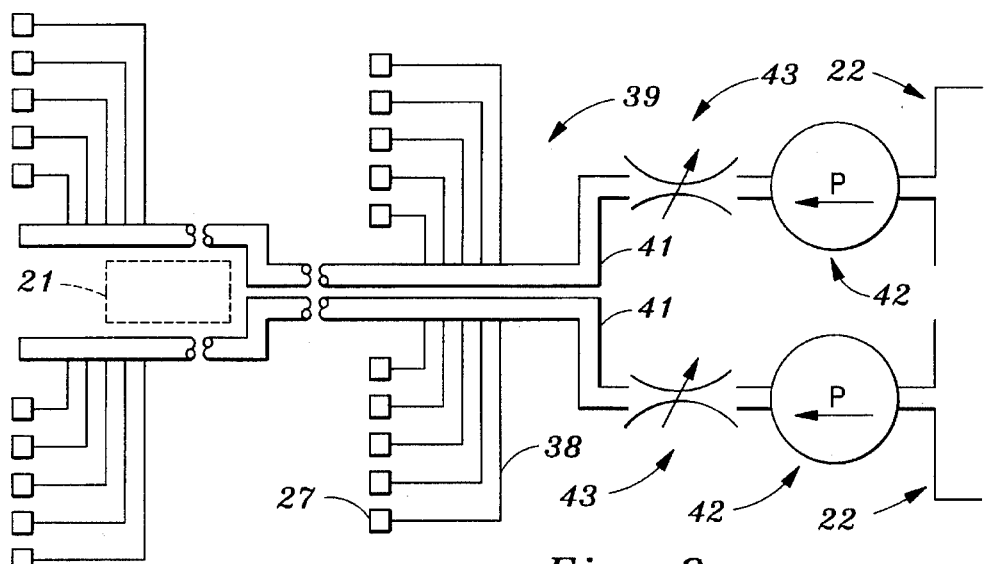
FIG. 8 is a schematic diagram of airflow generating and distributing components of the boat of the preceding figures.

With reference to FIGS. 2 and 8 in combination, this embodiment of the invention has two air intakes 22 and manifolding 39 which includes a pair of air ducts 41 that extend rearward, preferably along the keel region 31 of the boat 16. Ducts 39 may be angled as necessary to avoid motor 21 or other components of the boat 16. The flexible air hoses 38 which supply air to apertures 27 are coupled to ducts 41. In the present example the air hoses 38 at one side of keel region 31 are coupled to one of the ducts 41 and the hoses at the opposite side of the keel region couple to the other duct although this is not essential in all cases. The manifolding 39 may include only a single duct or additional ducts depending on the configuration of the interior of the boat 16.

In this example of the invention, each duct 41 receives pressurized air from a separate one of the intakes 22 through a separate one of a pair of air compressor pumps 42 and a separate one of a pair of flow control valves 43 which enable the operator to block the flow path from intakes 22 to apertures 27 when it is desired to inactivate the friction reducing system such as when rapid slowing of boat motion is desired.

Figure 6:
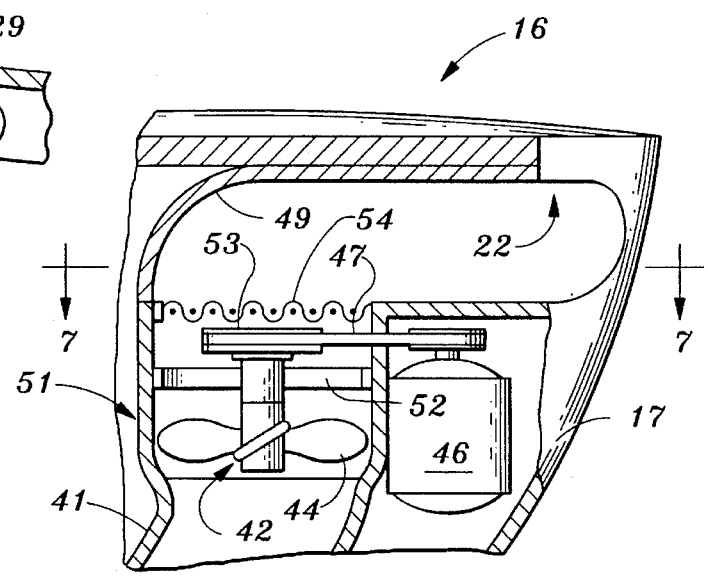
FIG. 6 is an elevation section view of a portion of the bow region of the boat of the preceding figures taken along line 6—6 of FIG. 2.
Figure 7:
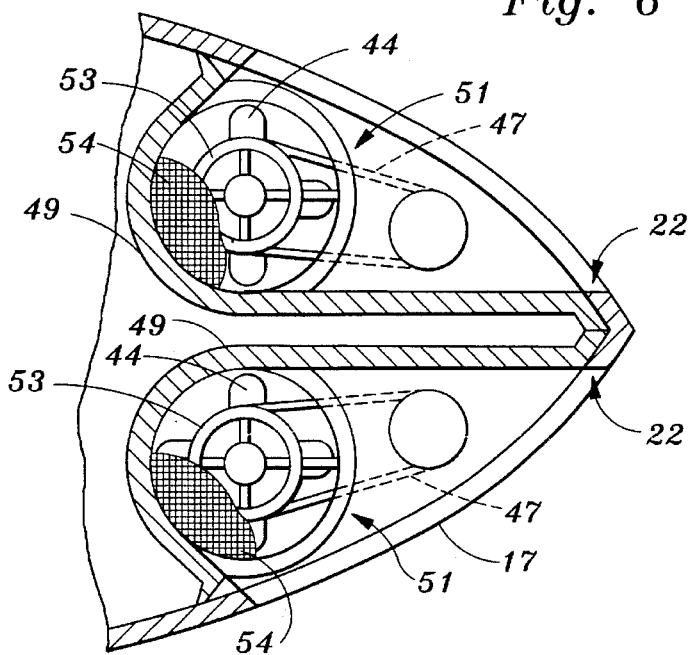
FIG. 7 is a plan section view of the bow region of the boat taken along line 7—7 of FIG. 6.

Referring jointly to FIGS. 6 and 7, the air compression means 42 may be of any of various types and in the present example are bladed rotary fans 44 driven by electric motors 46 through belts 47, the motors being operated with current from the electrical system of the boat 16. The previously described air ducts 41 extend to the bow region 48 of the boat 16 and each is communicated with a separate one of the air intakes 22 which in the present embodiment are openings formed in the bow region of hull 17 above the level of the surface of the water which supports the boat and at opposite sides of the keel region of the boat. Air intake 22 openings are larger than the passages within ducts 41 and are communicated with the ducts through air scoop structure 49 which forms flow passages that diminish in size in the direction of the upper ends 51 of the ducts 41. The rotary fans 44 are situated within the upper ends 51 of ducts 41 and are supported in coaxial relationship with the ducts by brackets 52. The pulleys 53 through which drive belts 47 are coupled to fans 44 are preferably of a spoked or apertured type in order to minimize obstruction of the air flow path. Screens 54 are preferably disposed at the entrances to the upper ends 51 of ducts 41, above fans 44, to prevent entry of sizable objects into the ducts that might clog the air flow passages.

As the large intake 22 openings and air scoop structure 49 face in the direction of travel of the boat 16, high speed motion of the boat supplements the action of fans 44 in producing an inflow of air. In fact, at very high speeds an airflow adequate to reduce frictional drag significantly may be realized without the fans 44 or other motor driven air compression means.

Figure 9:
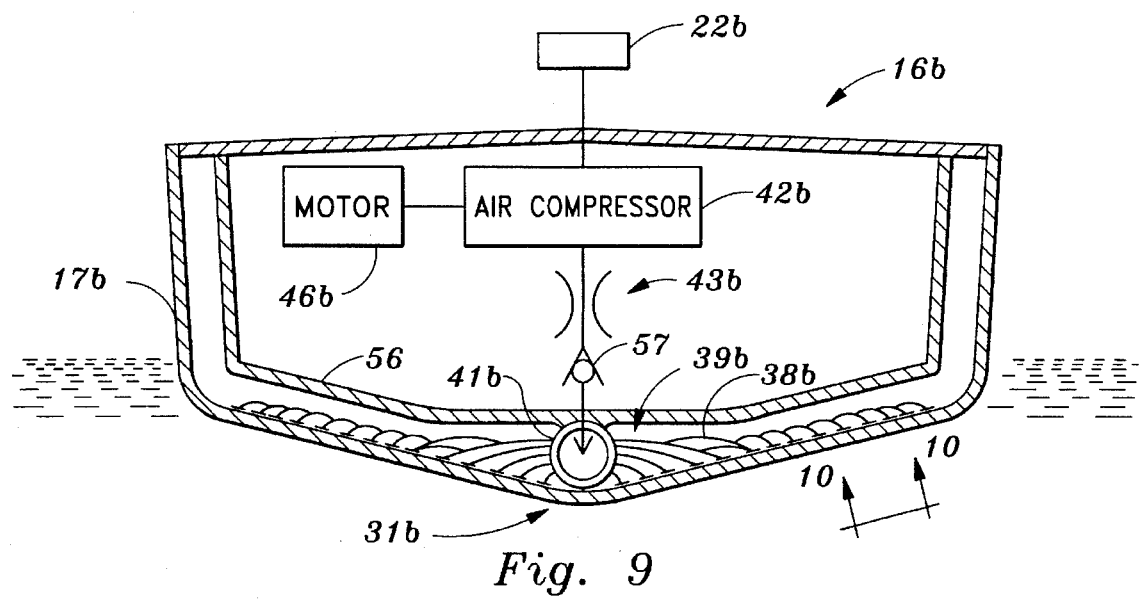
FIG. 9 is a cross section view of the hull of another boat in accordance with a second embodiment of the invention.
Figure 10:
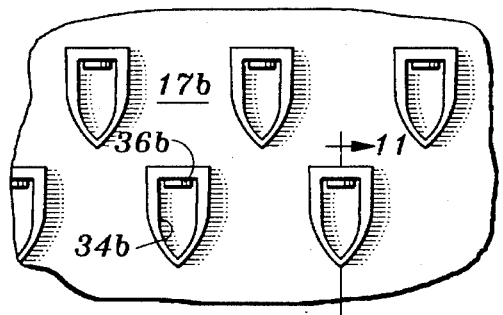
FIG. 10 is an enlarged view of a portion of the underside of the boat hull of FIG. 9 taken along line 10—10 thereof.
Figure 11:
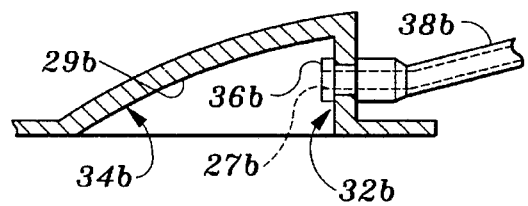
FIG. 11 is an elevation section view taken along line 11—11 of FIG. 10.

FIGS. 9, 10 and 11 depict another boat 16b embodying advantageous variations of the invention. The boat 16b in this case is of the type which has an inner hull 56 that is spaced from the outer hull 17b. In double hulled vessels of this kind, the airflow delivery manifolding 39b can be situated between the two hulls 56 and 17b to avoid complication of the structure of the inner hull 56. In the present example, manifolding 39b includes a single large air duct 41b that extends along the keel region 31b of the boat 16b between the two hulls 17b and 56 and connects with each of the air hoses 38b that supply the airflow apertures 27b.

An air compressor 42b driven by a motor 46b receives air from an intake 22b and transmits pressurized air to duct 41b through a flow control valve 43b. In instances where the compressor 42b is of the positive displacement type such as in this embodiment or if the rotary fans of the previously described embodiment are situated below the waterline, a one way flow valve or check valve 57 may be situated in the air flow path between the compressor and apertures 27b to protect the compressor and motor from an inflow of water during periods when the motor and compressor are shut down. This also reduces the loss of buoyancy that is brought about by such water entry. Alternately, an individual one way check valve 57 can be situated in each of the air flow apertures 27 or in hoses 38b to prevent or to minimize the buoyancy reduction.

The airflow apertures 27 of the previously described embodiments of the invention include groups of such apertures that are situated together in grooves in the boat hull. In the embodiment of FIGS. 10 and 11, each such aperture 27b is situated in an individual indentation 29b in the boat hull 17b to enable a more distributed positioning of the air outflows on the hull and to thereby provide for a more uniform layer of air bubbles adjacent the hull. Each such indentation 29b has a vertically extending forward surface 32b that faces away from the bow of the boat and in which one of the airflow aperture fittings 36b is situated. The back surface 34b of each indentation 29b slopes outward to channel air backward on to the following surface of hull 17b.

Figure 12:
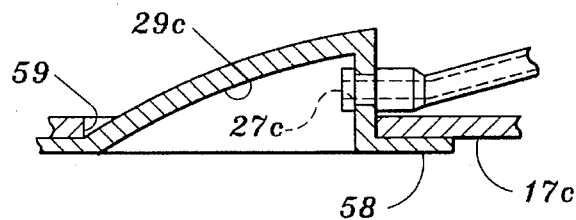
FIG. 12 is an elevation section view illustrating a modification of the structure depicted in FIG. 11.

The indentations 29b of the embodiment of FIGS. 10 and 11 are integrally formed in the boat hull 17b at the time of fabrication of the hull. Referring now to FIG. 12, essentially similar indentations 29c can be retrofitted onto pre-existing hulls 17c of conventional design by forming the indentations 29c in plates 58 which can be secured to the hull 17c by bolts, welds or the like. Openings 59 are cut into the hull 17c to receive the indentations 29c.

Figure 13:
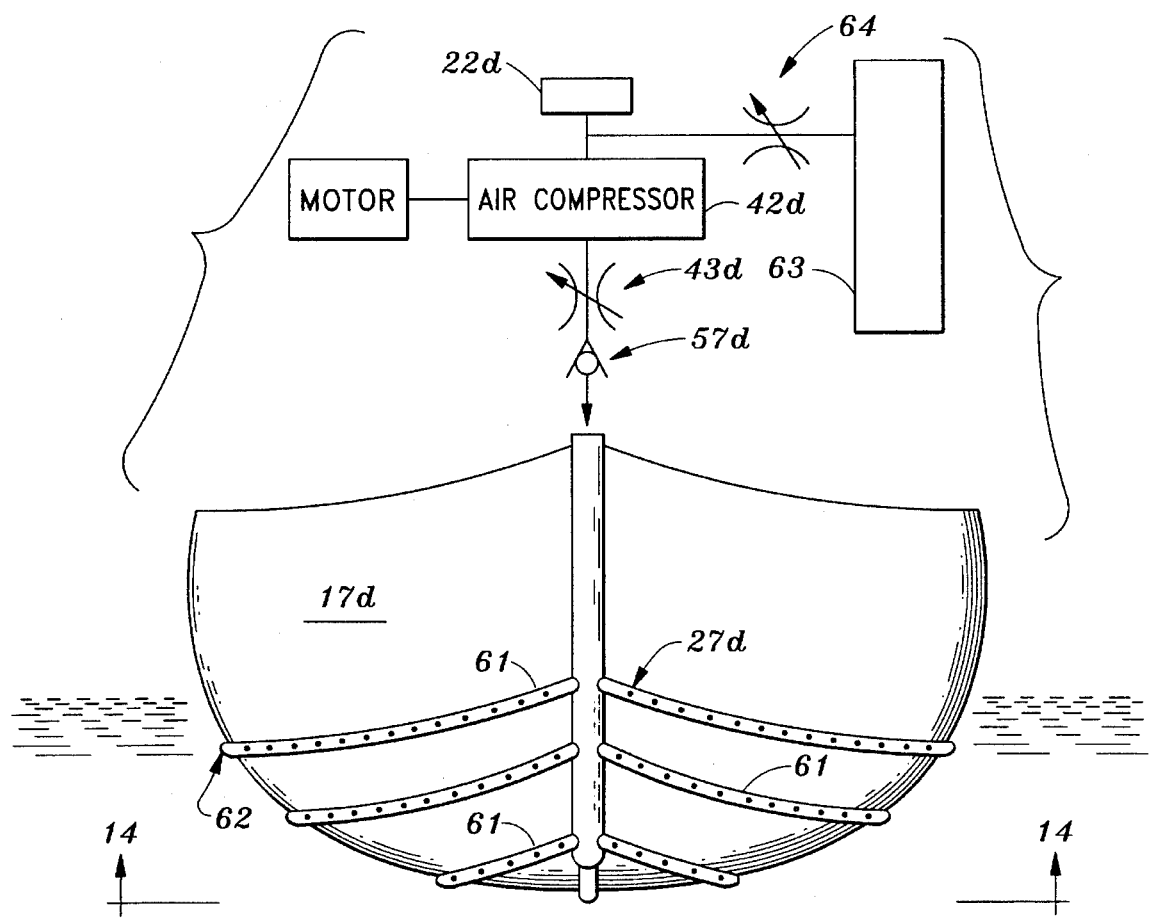
FIG. 13 is a front view of the hull of another boat in accordance with a third embodiment of the invention and schematically depicts certain further components of the boat.
Figure 14:
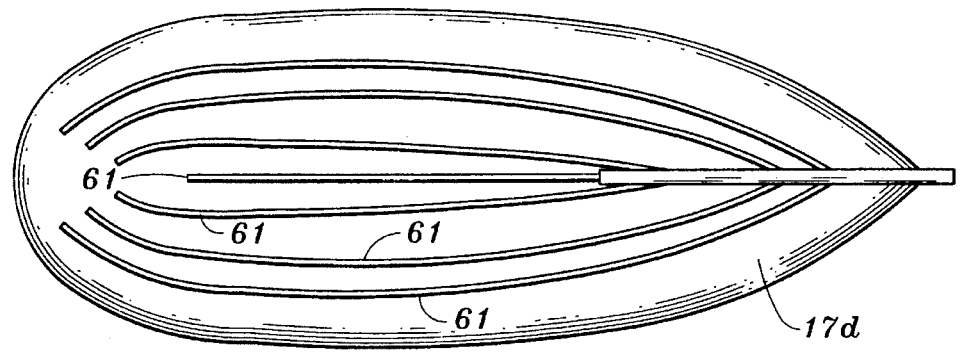
FIG. 14 is a view of the undersurface of the boat hull of FIG. 13 taken along line 14—14 thereof.

FIGS. 13 and 14 depict another embodiment of the invention which is also easily installed on pre-existing conventional hulls 17d as well as being suitable for new hulls. In this embodiment, spaced apart air pipes 61 extend along the underside of the hull 17d and the airflow emitting apertures 27d are situated in the pipes. The pipes 61 are secured to hull 17d by welds 62 or other means. Preferably the air pipes 61 extend longitudinally along the hull 17d to minimize drag. Air from an intake 22d is supplied to the pipes 61 through a flow control valve 43d, motor driven compressor 42d and one way flow valve 57d in this embodiment.

The air bubble generating system of any of the above described embodiments of the invention can also be adapted to inhibit adherence of barnacles to a hull while the boat is docked or anchored. Referring to FIG. 13, a flow of barnacle repelling fluid from a storage container 63 may be added to the airflow or may replace the airflow by opening a flow control valve 64 which communicates the container with the intake of compressor 42d in this instance.

The barnacle repelling fluid should be of a type that does not have adverse environmental effects. As one example, an airflow with an enriched carbon dioxide gas content produces the desired effect without causing any pollution or contamination of the water.

While the invention has been described with reference to certain specific embodiments for purposes of example, many variations and modifications are possible and it is not intended to limit the invention except as defined in the following claims.

I claim:

1. In a boat having a hull with a bow and a stern and having a hull region that is submerged during floatation of the boat and wherein said submerged hull region has opposite surfaces which extend continuously outward and continuously upward from the keel line of said hull to the surface of the body of water which supports said boat, the improvement comprising:

said hull having a plurality of airflow apertures arranged in an array that extends both transversely and longitudinally at said submerged region of said hull including at each of said outwardly and upwardly extending opposite surfaces thereof, said array having forward apertures that are closest to said bow and rearward apertures that are closest to said stern and additional apertures situated in the region between said forward and rearward apertures at a plurality of locations that are progressively further from said bow, said airflow apertures being sized and positioned to generate an unconfined layer of intermixed air bubbles and water that extends along at least a portion of each of said outwardly and upwardly extending opposite surfaces of said submerged region of said hull in contact with said hull, means for emitting a flow of air at said airflow apertures, and wherein the material of said hull has a plurality of spaced apart openings therein situated at the locations of said airflow apertures, further including a plurality of indentation members secured to said material of said hull in positions at which said indentation members close said openings therein, each of said indentation members having an indentation therein, said airflow apertures being situated at said indentations of said indentation members.

* * * * *